Patented Nov. 12, 1940

2,221,609

UNITED STATES PATENT OFFICE 2,221,609

PHOTOGRAPHIC VIEW FINDER

Otto Sänger, Wetzlar, Germany, assignor, by mesne assignments, to Frank Dumur, Lausanne, Switzerland Application October 28, 1938, Serial No. 237,448
In Germany December 4, 1937

1 Claim. (Cl. 88—1.5)

This invention relates to photographic image erecting telescopic view finders. The object of the invention is to provide an improved form of mask for framing the field of view characterized by that the field of view is easily distinguished from the general view and whereby adjacent portions of the general view may also be observed.

Masks for framing the field of view in view finders are known to the art. Some of these masks consist of two slidable framing members which may be operated to frame the view to be photographed but which do not afford a view of adjacent portions of the general view. The smaller the angle of view is the less one sees of the general view. Such masks are therefore not suitable in cases where it is desirable to observe portions of the general view which surround the particular field of view to be photographed. For instance, if one wishes to photograph a moving object it is obviously very desirable that one may observe the movements of such an object before it enters the field of view.

It has also been proposed to provide a separate plate in the image forming plane of the finder, such separate plate being provided with lines forming rectangles of different dimensions corresponding to the angles of view of different objectives. In such finder adjacent portions of the general view may be seen but the many lines appearing in the field of view are confusing and may lead one to pick out a field of view which does not correspond to the field of view of the objective.

The present invention eliminates these disadvantages by providing a mask which consists of two transparent movable members for framing the view. Or the two members may be provided with distinct framing members and so constructed that adjacent portions of the general view may also be seen.

Accordingly this invention is embodied in a view finder arranged and constructed as hereinafter set forth and as illustrated in the accompanying drawing in which Fig. 1 is a diagrammatic illustration of an image erecting telescopic view finder embodying the invention.

Figure 1:
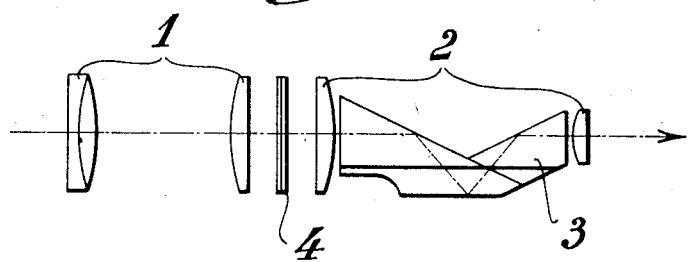
Figure 2:
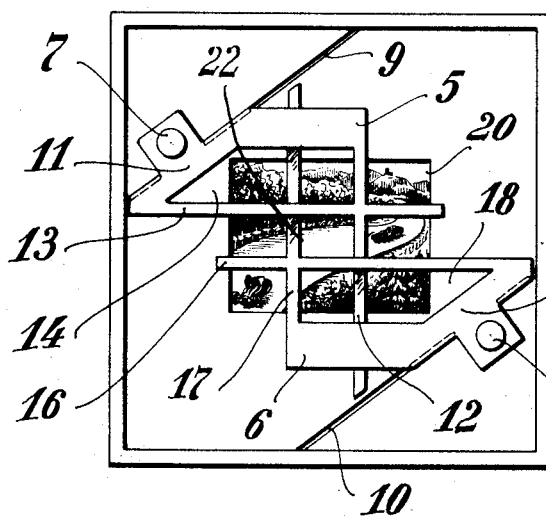
Fig. 2 is a view of the mask members according to one form of the invention.

Referring to Fig. 1 the view finder comprises generally an objective 1 and an ocular 2 which latter includes the image erecting prism 3. The numeral 4 denotes the mask for framing the field of view. The mask may consist of two mask members 5 and 6 as seen in Fig. 2. Each member is operated in a well known manner by means of pins 7 and 8, and when so operated the mask members slide diagonally towards or away from each other along guideways 9 and 10. Special actuating means for operating the mask members are not shown because such means are known in the art and form no part of this invention.

The mask member 5 consists of a main body portion 11 from which there extend two view framing members 12 and 13 at a fixed right angle to each other for forming the two sides of the field of view and also forming an opening at 14 through which adjacent portions of the general view may be seen as shown.

The other mask member 6 is symmetrical with the member 5 and has a main portion 15 and two framing members 16 and 17 forming the two other sides of the field of view. There is also an opening 18 between the members and the main body 15 permitting observation of the general view outside the field of view to be photographed. The view finder entrance opening is marked 20 within which one observes the general view as will be understood.

In operation the two mask members are moved diagonally along the guideways 9 and 10 and the four framing members 12, 13, 16 and 17 then form a centrally disposed rectangle 22 which frames the field of view which is to be photographed. The two members 12 and 13 form the right side and the top, the two other framing members 16 and 17 form the left side and the bottom of the frame which encloses the field of view. At the same time this mask permits the adjacent portions of the general view to be seen. Thus if a moving object is to be photographed the photographer can clearly see when such object enters the general view and when it is about to enter the field of view to be photographed. The mask of course also is of advantage in that it enables the photographer to easily pick out the particular view desired. Confusion is avoided because inasmuch as the two mask members move to the same extent, as is well known, the observer easily picks out the centrally formed rectangle.

Figure 3:
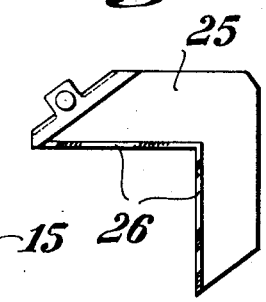
Fig. 3 shows a modification.

Fig. 3 illustrates a mask member 25 which is made of transparent material. The mask member is in the form of a rectangle and its inner edges 26 may be distinguished from the body 25 in any desirable manner. For instance these edges may be distinguished by a double line as shown. Or the edges may be colored differently from the body so that they will appear sharp and distinct. So also in this case the general background of the view may be observed outside the field of view of the finder itself.

I claim:

In a photographic view finder having an opening for observing the field of view, means in said finder for framing the view to be photographed, said means comprising two symmetrical movable mask members, each of said members consisting of a body portion and two integral narrow rule-formed members extending from said body portion, said two rule-formed members forming a fixed angle of ninety degrees for framing and defining two adjacent sides of the view to be framed, said mask member having a fixed opening between said body portion and said extension members for observing portions of the field of view other than that framed by the said two members and means for moving the said two mask members in opposite directions in parallel relation to frame and define the view.

OTTO SANGER.